(12) United States Patent
Nam et al.

(10) Patent No.: US 10,588,180 B2
(45) Date of Patent: Mar. 10, 2020

(54) COOKING TABLE TOP WITH LIGHT-TRANSMISSIVE PORTIONS

(71) Applicant: LG ELECTRONICS INC., Seoul (KR)

(72) Inventors: Hyeunsik Nam, Seoul (KR); Wansoo Kim, Seoul (KR); Dongseong Kwag, Seoul (KR); Yangkyeong Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/025,272

(22) Filed: Jul. 2, 2018

(65) Prior Publication Data

US 2018/0310367 A1 Oct. 25, 2018

Related U.S. Application Data

(63) Continuation of application No. 15/471,198, filed on Mar. 28, 2017, now Pat. No. 10,321,523.

(30) Foreign Application Priority Data

Mar. 28, 2016 (KR) .................. 10-2016-0037038

(51) Int. Cl.
*H05B 6/12* (2006.01)
*F24C 15/10* (2006.01)
(Continued)

(52) U.S. Cl.
CPC .......... *H05B 6/1218* (2013.01); *A47B 13/08* (2013.01); *A47B 13/12* (2013.01); *F24C 7/083* (2013.01);
(Continued)

(58) Field of Classification Search
CPC ...... F24C 7/083; H05B 6/1218; H05B 6/1245
(Continued)

(56) References Cited

U.S. PATENT DOCUMENTS 3,719,789 A    3/1973  Harnden
5,809,680 A *  9/1998  Scheidler ............... F24C 7/082
                                                    219/445.1
(Continued)

FOREIGN PATENT DOCUMENTS

CN    204629625    9/2015
DE    4405610      8/1995
(Continued)

OTHER PUBLICATIONS

United States Office Action in U.S. Appl. No. 15/471,198, dated Jun. 18, 2018, 10 pages.

*Primary Examiner* — Sean P Gramling
*Assistant Examiner* — Keith G. Delahoussaye
(74) *Attorney, Agent, or Firm* — Fish & Richardson P.C.

(57) ABSTRACT

Provided is a table top including: an upper plate, which is constituted by a plate-shaped non-magnetic member so as to support an electronic or cooking device placed thereon; an energy supply module, which is disposed under the upper plate so as to supply energy to the electronic or cooking device; at least one light source configured to generate light; and at least one light-transmissive portion, which is provided in the upper plate and through which the light generated by the light source is transmitted; and at least one light guide configured to guide the light, generated by the light source, to the light-transmissive portion, wherein the at least one light guide allows at least a portion of the light, generated by the light source, to be emitted upward from the upper plate through the light-transmissive portion.

19 Claims, 21 Drawing Sheets

(51) Int. Cl.
*A47B 13/08* (2006.01)
*H02J 50/12* (2016.01)
*A47B 13/12* (2006.01)
*H02J 7/02* (2016.01)
*F24C 7/08* (2006.01)
*H02J 50/10* (2016.01)
*H01F 38/14* (2006.01)
*H02J 50/90* (2016.01)
*F21V 8/00* (2006.01)

(52) U.S. Cl.
CPC .............. *F24C 15/10* (2013.01); *H02J 7/025* (2013.01); *H02J 50/10* (2016.02); *H02J 50/12* (2016.02); *H05B 6/1245* (2013.01); *G02B 6/0035* (2013.01); *G02B 6/0055* (2013.01); *G02B 6/0065* (2013.01); *G02B 6/0096* (2013.01); *H01F 38/14* (2013.01); *H02J 50/90* (2016.02); *H05B 2213/05* (2013.01); *H05B 2213/07* (2013.01)

(58) Field of Classification Search
USPC ........................................................ 362/23.1
See application file for complete search history.

(56) References Cited

U.S. PATENT DOCUMENTS

| | | |
|---|---|---|
| 2011/0011851 A1 | 1/2011 | Kataoka et al. |
| 2012/0118281 A1 | 5/2012 | Shigeoka et al. |
| 2012/0118870 A1 | 5/2012 | Shigeoka et al. |

FOREIGN PATENT DOCUMENTS

| | | |
|---|---|---|
| DE | 4424847 | 1/1996 |
| EP | 2690925 | 1/2014 |
| EP | 2827064 | 1/2015 |
| JP | H07312280 | 11/1995 |
| JP | 2007139246 | 6/2007 |
| JP | 2015066181 | 4/2015 |
| KR | 1020130138798 | 12/2013 |
| KR | 1020160012966 | 2/2016 |
| WO | WO2009053271 | 4/2009 |
| WO | WO2015068093 | 5/2015 |
| WO | WO2015068393 | 5/2015 |
| WO | WO2015136204 | 9/2018 |

* cited by examiner

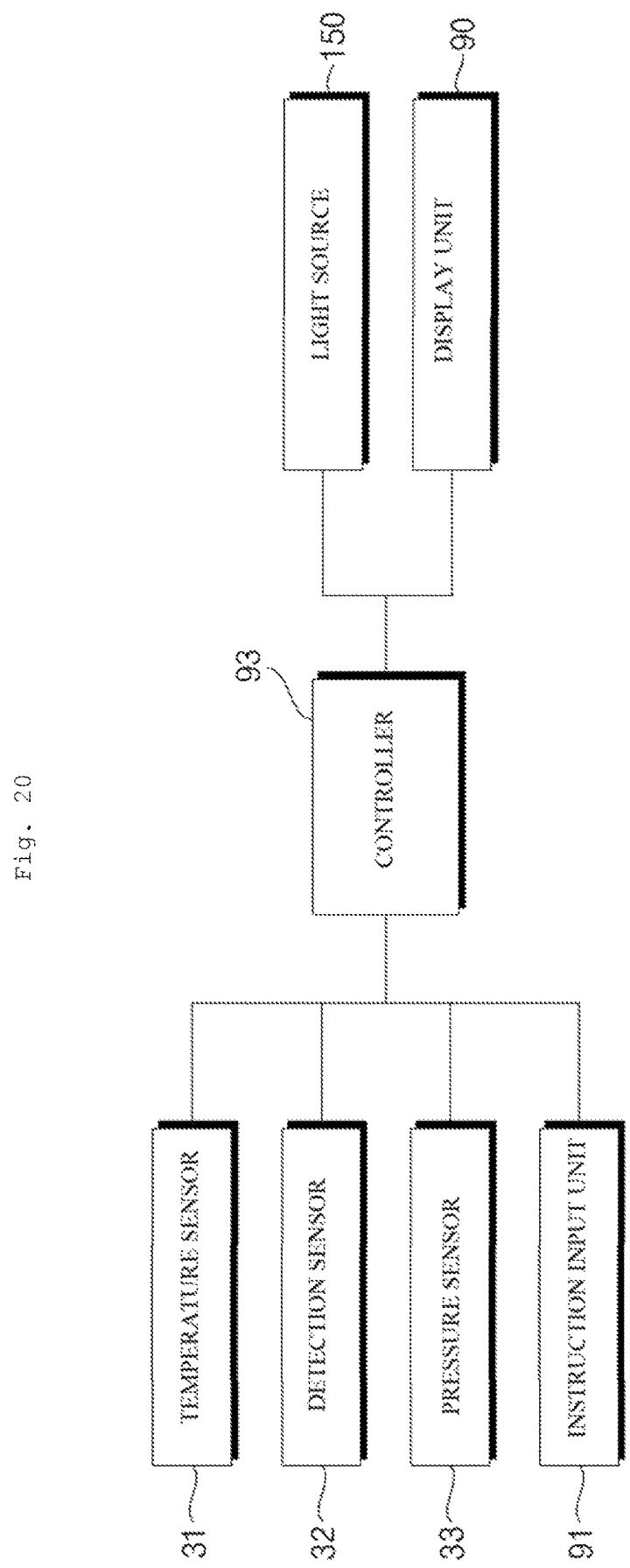

COOKING TABLE TOP WITH LIGHT-TRANSMISSIVE PORTIONS

CROSS-REFERENCE TO RELATED APPLICATION

This application is a continuation of U.S. application Ser. No. 15/471,198, filed on Mar. 28, 2017, which claims the priority benefit of Korean Patent Application No. 10-2016-0037038, filed on Mar. 28, 2016 in the Korean Intellectual Property Office, the disclosures of which are incorporated herein by reference.

BACKGROUND OF THE INVENTION

1. Field of the Invention

The present disclosure relates to a table top.

2. Description of the Related Art

A table top, which is generally used as a table at home and restaurants, was conventionally used to support objects.

Recently, such table top is used in multipurpose applications, with a cooking device or an electronic device being provided thereon to make better use of space.

Particularly, there has been released a table top, which has an induction heating device for heating metal cooking equipment by induction heating.

As the table top is used in many applications and is installed at various positions, an induction heating device, which is mounted at the table top, is required to be disposed at various positions selected by a user. However, the existing table top has a problem in that the induction heating device is fixed at a position, such that the position may not be readily changed.

Further, a heating region is printed on an upper plate of the table top including the existing induction heating device. In this case, however, there is a problem in that the printing may be damaged by the heat of cooking equipment heated by induction heating. In addition, there is also a problem in that the position of the printed heating region is fixed, such that the heating region cannot be changed when the position of the induction heating device is changed.

SUMMARY OF THE INVENTION

The present disclosure provides a table top, which enables an energy supply module to be readily disposed at various positions according to user convenience.

Further, while maintaining rigidity and shape of the table top, a heating region, where a cooking device and the like is to be positioned, may be displayed on an upper portion of the table top, and the position of the heating region may be readily changed.

In one general aspect, there is provided a table top including: an upper plate, which is a plate-shaped non-magnetic member and supports an electronic or cooking device placed thereon; an energy supply module, which is disposed under the upper plate so as to supply energy to the electronic or cooking device; at least one light source configured to generate light; and at least one light-transmissive portion, which is provided in the upper plate and through which the light generated by the light source is transmitted; and at least one light guide configured to guide the light, generated by the light source, to the light-transmissive portion, wherein the at least one light guide allows at least a portion of the light, generated by the light source, to be emitted upward from the upper plate through the light-transmissive portion.

BRIEF DESCRIPTION OF THE DRAWINGS

FIG. 20 is a control block diagram illustrating a table top according to an exemplary embodiment.

DETAILED DESCRIPTION OF THE PREFERRED EMBODIMENTS

Figure 1:
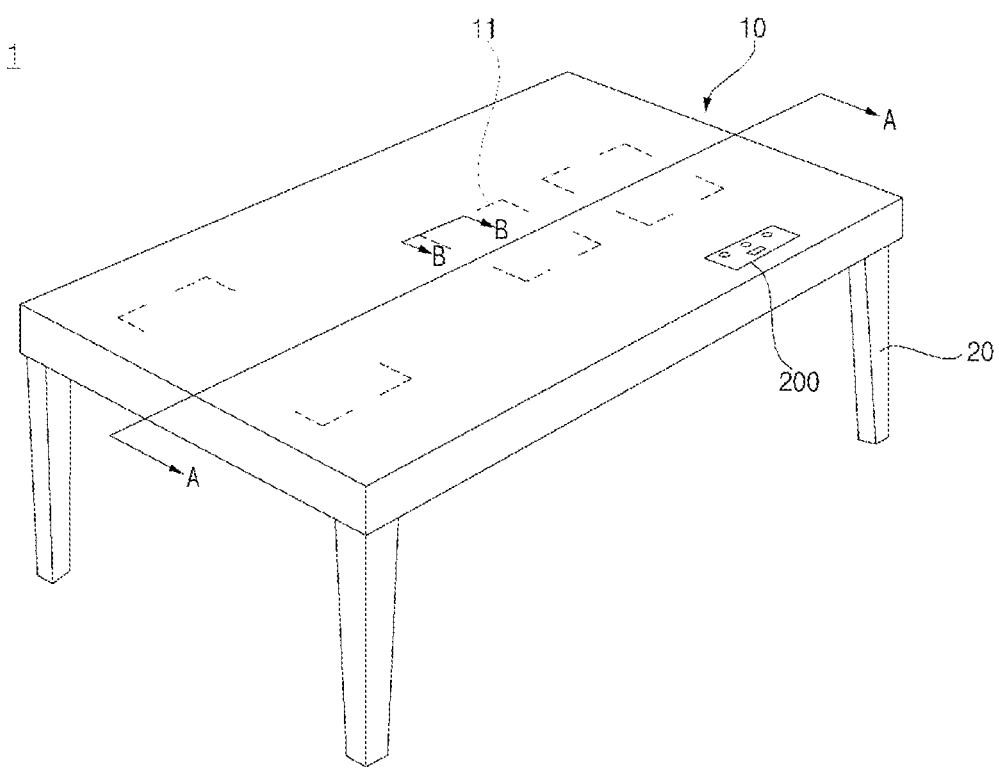
FIG. 1 is a concept diagram illustrating a table top according to an exemplary embodiment of the present invention.

Hereinafter, embodiments of the present disclosure will be described in detail with reference to the accompanying drawings.

Advantages and features of the present invention and methods for achieving those of the present invention will become apparent upon referring to embodiments described later in detail with reference to the attached drawings. However, embodiments are not limited to the embodiments disclosed hereinafter and may be embodied in different ways. The embodiments are provided for perfection of disclosure and for informing persons skilled in this field of art of the scope of the present invention. The same reference numerals may refer to the same elements throughout the specification.

Spatially-relative terms such as "below", "beneath", "lower", "above", or "upper" may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" or "beneath" other elements would then be oriented "above" the other elements. The exemplary terms "below" or "beneath" can, therefore, encompass both an orientation of above and below. Since the device may be oriented in another direction, the spatially-relative terms may be interpreted in accordance with the orientation of the device.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, the thickness or size of each layer is exaggerated, omitted, or schematically illustrated for convenience of description and clarity. Also, the size or area of each constituent element does not entirely reflect the actual size thereof.

Hereinafter, exemplary embodiments of the present invention will be described with reference to the accompanying drawings.

Figure 2:
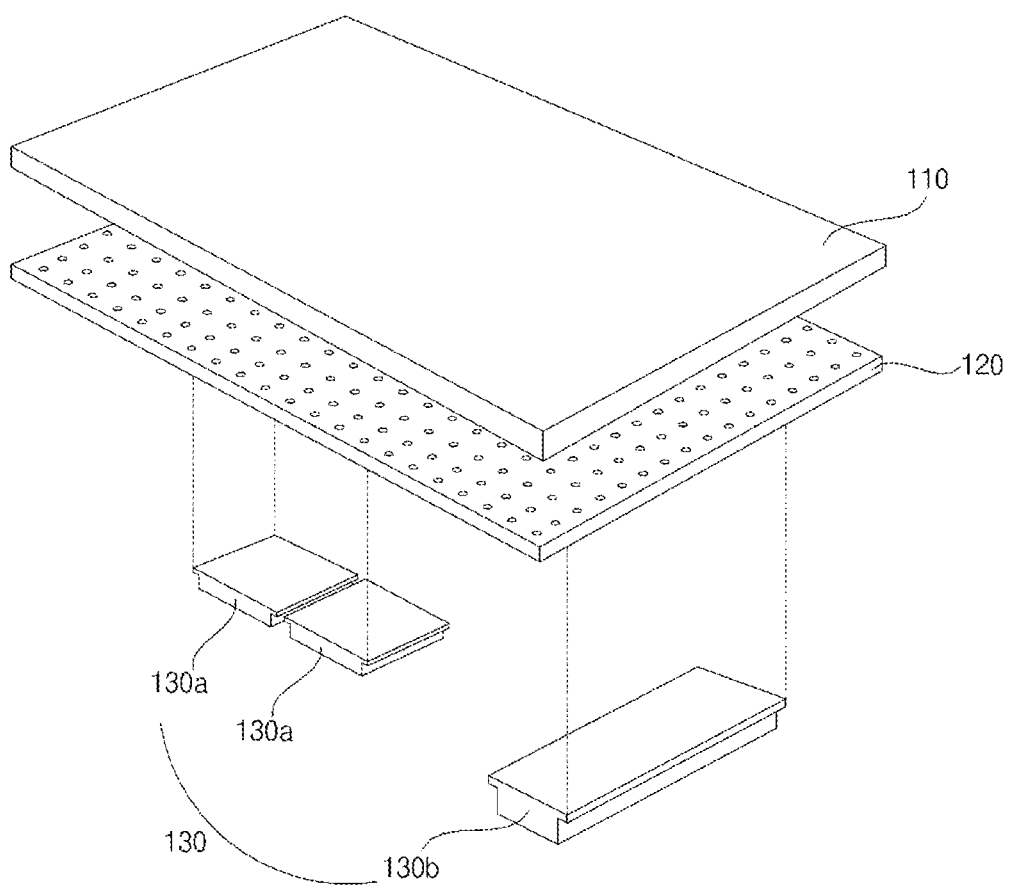
FIG. 2 is an exploded view of a table top according to an exemplary embodiment of the present invention.
Figure 3:
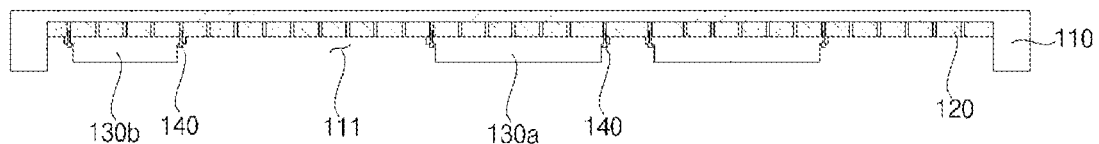
FIG. 3 is a cross-sectional view of the table top of FIG. 1 taken along line A-A of FIG. 1.
Figure 4:
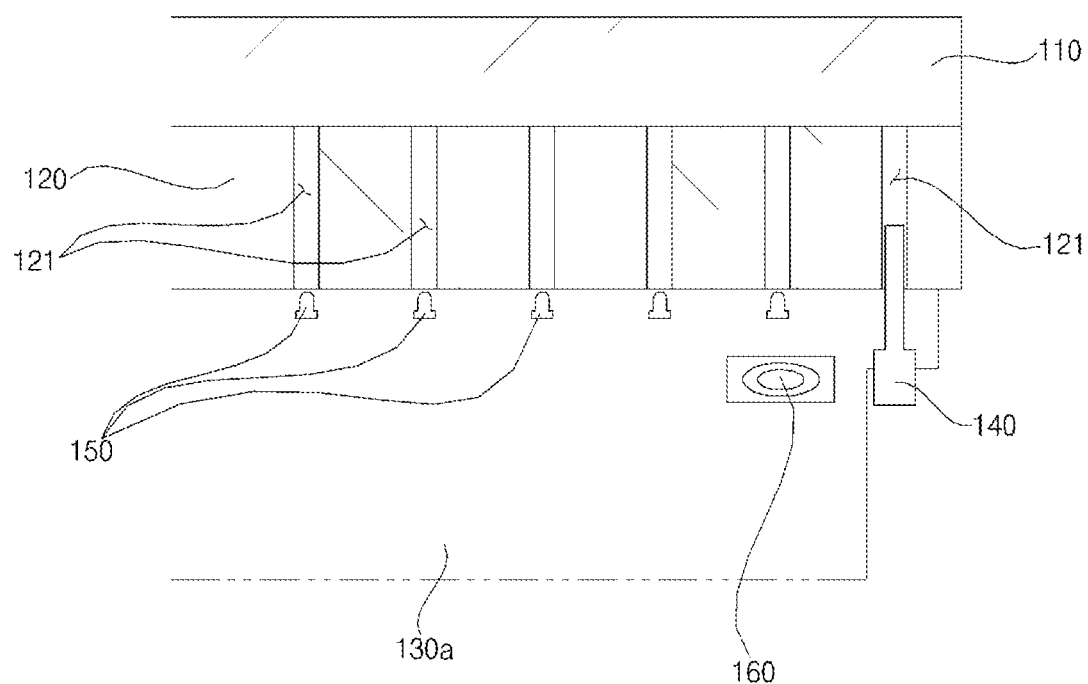
FIG. 4 is a cross-sectional view of the table top of FIG. 1 taken along line B-B of FIG. 1.

FIG. 1 is a concept diagram illustrating a table top according to an exemplary embodiment of the present invention; FIG. 2 is an exploded view of a table top according to an exemplary embodiment of the present invention; FIG. 3 is a cross-sectional view of the table top of FIG. 1 taken along line A-A of FIG. 1; FIG. 4 is a cross-sectional view of the table top of FIG. 1 taken along line B-B of FIG. 1.

Referring to FIGS. 1 to 4, the table top 1 includes a main body 10, an energy supply module 130, a light source 150, and a light-transmissive portion.

The table top 1 supports cooking devices, and supplies energy to the cooking devices and electronic devices. Further, the table top 1 provides a space for cooking.

The main body 10 supports the cooking devices or electronic devices. Here, the main body 10 may include an upper plate 120, or may include the upper plate 120 and a cover 110. FIGS. 1 to 4 illustrate an example where the main body 10 is composed of the upper plate 120 and the cover 110, and other examples will be described later.

Legs 20, which support the main body 10, are positioned at the bottom of the main body 10. The legs 20 may be connected with the cover 110 and/or the upper plate 120 at the bottom thereof.

The cover 110 is positioned on an upper portion of the upper plate 120, and covers at least the upper portion of the upper plate 120. The cover 110 supports a cooking device and/or an electronic device. Further, the cover 110 includes an accommodating portion 111 to accommodate the upper plate 120 and the energy supply module 130. The accommodating portion 111 is positioned at a lower portion of the cover 110, and is a space defined by the cover 110. Specifically, the cover 110 includes: the accommodating portion 111 in which the upper plate 120 and the energy supply module 130 are accommodated; and an opening at the bottom, in which the opening may be opened and closed by a lower plate (not shown). The cover 110 forms an outer appearance of the main body 10.

The cover 110 may be formed of material having heat resistance and rigidity without interference with electromagnetic induction generated between the energy supply module 130 and an electronic device or a cooking device. Further, the cover 110 may also be made of a transparent and/or semi-transparent material, through which light generated by the light source 150 may be transmitted. Particularly, the cover 110 is made of material having heat resistance, light transmission, and non-magnetic properties. For example, the cover 110 may be made of any one of marble, wood, and resin material, but the material of the cover 110 is not limited thereto.

In FIGS. 1 to 4, a controller 200 is further included, which receives input of a control instruction from a user, and generates a control signal. The controller 200 controls the light source 150 and/or the energy supply module 130. The controller 200 is disposed at the cover 110, and more specifically, is exposed on an upper portion of the cover 110.

The upper plate 120 constitutes the main body 110 alone or in combination with the cover 110. The upper plate 120 supports an electronic device or a cooking device. The upper plate 120 is disposed at the bottom of the cover 110. The upper plate 120 has a plate shape, and the shape of the upper plate 120 corresponds to the shape of the cover 110.

Specifically, the upper plate 120 is made of material having rigidity and non-magnetic properties for the rigidity of the main body 10. For example, the main body 10 is made of resin or wood material.

The upper plate 120 provides a space to connect the energy supply module 130, and light generated by the light source 150 is transmitted through the upper plate 120. FIGS. 1 to 4 illustrates an example where a light-transmissive portion is included, which may allow light, generated by the light source 150, to be emitted upward from the upper plate 120 without reducing rigidity of the upper plate 120.

The light-transmissive portion is provided at the upper plate 120, and enables light, generated by the light source 150, to be transmitted. Specifically, the light-transmissive portion enables at least a portion of light, generated by the light source 150, to be emitted upward from the upper plate 120.

The light-transmissive portion may be a hollow space through which light is transmitted, or may be made of a transparent material. For example, the light-transmissive portion may be a hole or a groove having a plurality of dots, or a hole or a groove having a plurality of lines. The shape of the light-transmissive portion is not limited thereto, and may be selected at will depending on a boundary pattern 11.

It is desired that the light-transmissive portion is a groove or a hole with a plurality of dots being arranged regularly, so that a coupling member, which will be described later, may be easily coupled and arranged. FIGS. 1 to 4 illustrate an example where the light-transmissive portion is composed of a plurality of light-transmissive holes 121, which are formed by perforating the upper plate 120 upward from below.

The light-transmissive holes 121 are space where light, generated by the light source 150, passes. After passing through the light-transmissive holes 121, light is projected onto the cover 110, thereby forming the boundary pattern 11 to display a position where a cooking device or an electronic device is located. Further, after passing through the light-transmissive holes 121, light is emitted upward from the upper plate 120, thereby forming the boundary pattern 11 to display a position where a cooking device or an electronic device is located.

There is no limitation on the diameter of the light-transmissive holes 121, but the diameter is desired to be in a range of 1 mm to 3 mm in consideration of rigidity and light transmittance of the upper plate 120.

Further, a plurality of light-transmissive holes 121 determine a connection position of the energy supply module 130. Specifically, when viewed from above, the plurality of light-transmissive holes 121 are disposed regularly on the upper plate 120. That is, the plurality of light-transmissive holes 121 are arranged in rows and columns at a regular pitch. Accordingly, when the energy supply module 130 is connected, the coupling member 140, connected with the energy supply module 130, is coupled with any one of the plurality of light-transmissive holes 121.

That is, the light-transmissive holes 121 enable a user to recognize an arrangement position of a cooking device or an electronic device, and provide a space to couple the coupling member 140.

The energy supply module 130 is positioned at a bottom surface of the upper plate 120 to supply energy to an electronic device or a cooking device. The energy supply module 130 is accommodated in the accommodating portion 111 of the cover 110, and is connected to the bottom surface of the upper plate 120.

For example, the energy supply module 130 includes an induction heating device 130a and/or a wireless charger transmitter 130b.

The induction heating device 130a heats a cooking device by inducing an eddy current to the cooking device, in which induction heating is a method of heating metal by using electro-magnetic induction. The wireless charger transmitter 130b supplies power to an electronic device in connection with a wireless charger receiver included in the electronic device.

The wireless charger transmitter 130b and the wireless charger receiver, which are formed as a pair, form a wireless charging system. The wireless charging system may be generally selected between the following two types: an electro-magnetic induction type and a magnetic resonance type.

Electro-magnetic induction is a process where a conductor, through which electricity flows, and is placed in a changing magnetic field, causes the production of a voltage across the conductor, and in turn, causes an electrical current. In this process, power is charged, which is a driving source for operating an operation unit of an electronic device.

Magnetic resonance uses strong magnetic-field-induced coupling between magnetic resonators having a uniform resonant frequency, in which an electric current is generated in such a manner that by employing a magnetic resonance phenomenon, which produces vibrations with a large amplitude at a specific frequency, one coil is connected to a wireless charger transmitter 130b and the other coil is connected to an electronic device, so that the frequencies of the two coils may be tuned.

The electro-magnetic induction type has a high charging efficiency of 90% compared to wired charging, but has a drawback in that the wireless charger transmitter 130b and the wireless charger receiver are required to be located close to each other within a distance of 1 cm to 2 cm. By contrast, the magnetic resonance type may provide remote charging, but has a low charging efficiency of 70% compared to wired charging.

The wireless charging system may be applied to the two types regardless of the types of principle of wireless charging, but the magnetic resonance type is desired.

Hereinafter, an induction heating device 130a, which is an example of the energy supply module 130, and the light source 150 installed in the energy supply module 130 will be described in detail.

Figure 5:
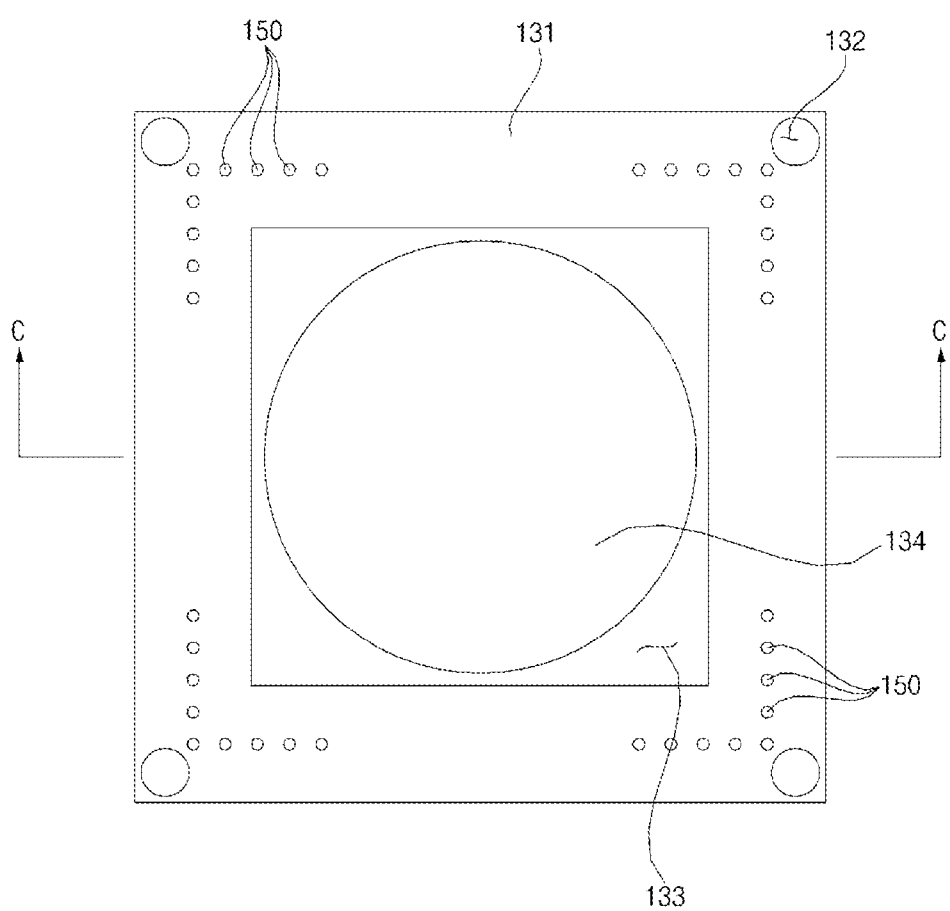
FIG. 5 is a diagram illustrating an energy supply module according to an exemplary embodiment of the present invention.
Figure 6:
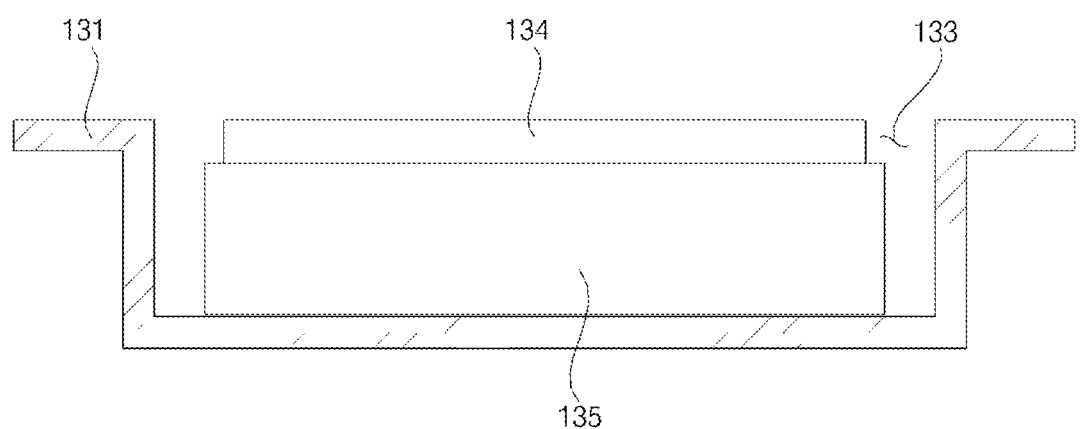
FIG. 6 is a cross-sectional view of the energy supply module of FIG. 5 taken along line C-C of FIG. 5.

FIG. 5 is a diagram illustrating an energy supply module 130, as seen from above, according to an exemplary embodiment of the present invention; and FIG. 6 is a cross-sectional view of the energy supply module of FIG. 5 taken along line C-C of FIG. 5.

Referring to FIGS. 4 to 6, the induction heating device 130a includes: a case 131 having an accommodating space 133; a working coil 134, which is installed in the case 131 and is exposed on an upper portion of the case 131, and generates a magnetic field; and a substrate 135 which provides an induction voltage to operate the working coil 134.

The case 131 has an open top, and the accommodating space 133 is defined in the case 131. A flange is formed on the periphery of the case 131, and a through-hole 132, through which the coupling member 140 passes, is formed at the flange. The through-hole 132 is a space where the coupling member 140 passes. The coupling member 140 is coupled to the light-transmissive portion.

The working coil 134 generates a magnetic field to heat, by induction heating, an object close to the working coil 134. The working coil 134 is exposed on the upper portion of the case 131, and is disposed adjacent to the upper plate 120.

The light source 150 generates light. The light source 150 is connected with the controller 200 and/or the energy supply module 130, to display the state of the controller 200 and/or the energy supply module, and to display the position of a cooking device or an electronic device on the cover 110.

The light source 150 may be a light emitting diode (LED). The light source 150 includes at least one light emitting device, in which light emitting devices may be divided into a plurality of groups. The light emitting device may be a light emitting diode chip which emits light in any one of three colors of red, green, and blue. In this case, all the plurality of light emitting devices may emit white light, providing white illumination, or the light emitting devices may provide illumination of a specific color by combining LEDs in red, green, and blue, or may provide white light.

There is no limitation on the position of the light source 150. For example, the light source 150 may be disposed in the energy supply module 130 and/or the upper plate 120. In another example, the light source 150 may be disposed in the energy supply module 130, and the energy supply module 130 may be included as a space to accommodate the light source 150 of the upper plate 120.

In this embodiment, the light source 150 is disposed in the energy supply module 130. The light source 150 may include a plurality of light emitting devices arranged to form a specific shape or line.

As illustrated in FIG. 5, the plurality of light sources 150 are disposed on at least a portion of a periphery of the energy supply module 130. The plurality of light sources 150 are disposed to correspond to the plurality of light-transmissive holes 121. The light sources 150 may display a boundary of a region in which a cooking device or an electronic device, supported by the cover 110, may be operated by the energy supplied from the energy supply module 130. Specifically, the plurality of light sources 150 may display a boundary to enable the induction heating device 130*a* to induce an eddy current to a cooking device.

More specifically, the plurality of light sources 150 are installed in the case 131 in a manner that exposes the light sources 150 on an upper portion of the case 131. When viewed from the above, the plurality of light sources 150 are disposed on at least a portion of a certain curve surrounding the working coil 134.

Accordingly, the plurality of light sources 150 enable a user to recognize a region where a cooking device or an electronic device, supported by the cover 110, may operate, such that the user may easily determine the position of the cooking device or the electronic device.

A Radio Frequency Identification (RFID) reader 160, which receives information of Radio Frequency Identification (RFID) tag provided for a cooking device or an electronic device, may be installed in the energy supply module 130. The RFID reader 160 provides the received information of Radio Frequency Identification (RFID) tag to the controller 200. Base on the received information of Radio Frequency Identification (RFID) tag, the controller 200 controls operation intensity of the energy supply module 130 and controls whether to operate the energy supply module 130.

Figure 7A:
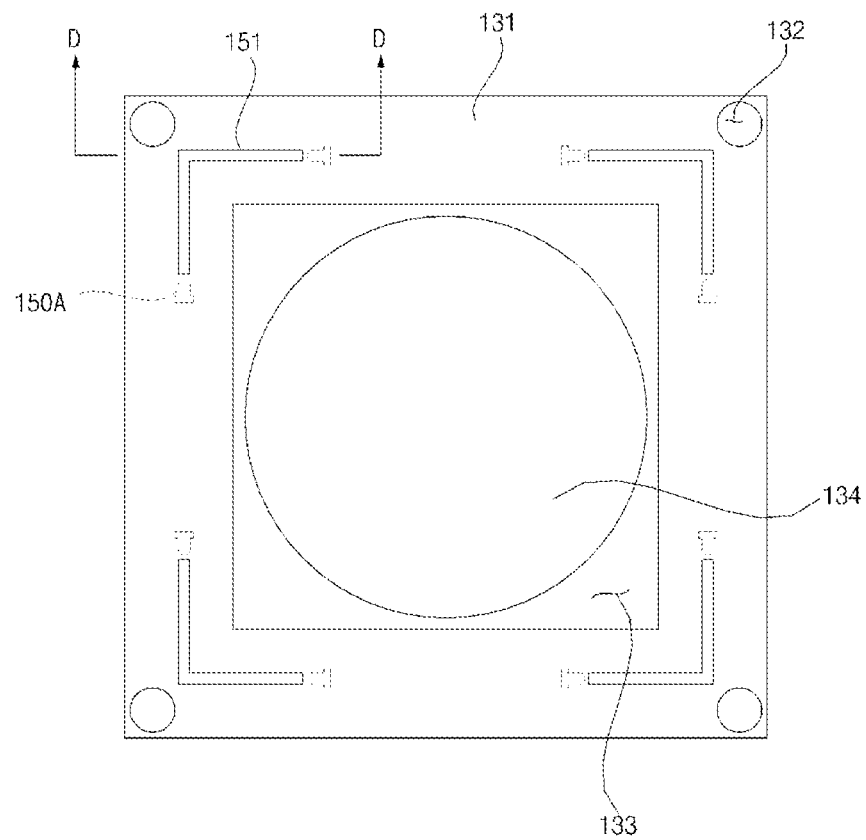
FIG. 7A is a diagram illustrating an energy supply module according to another exemplary embodiment of the present invention.
Figure 7B:
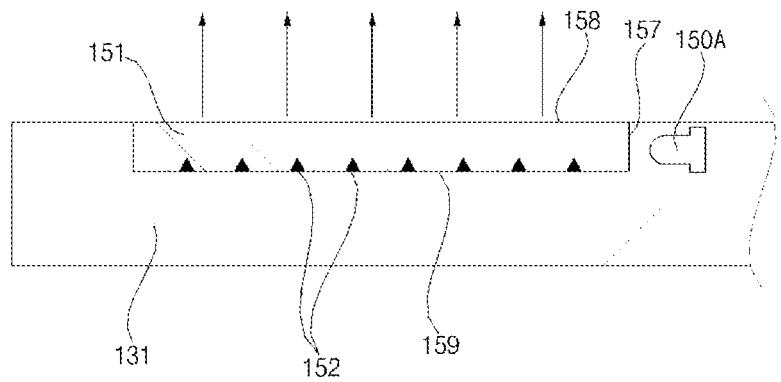
FIG. 7B is a cross-sectional view of the energy supply module of FIG. 7A taken along line D-D of FIG. 7A.

FIG. 7A is a diagram illustrating an energy supply module according to another exemplary embodiment of the present invention; and FIG. 7B is a cross-sectional view of the energy supply module of FIG. 7A taken along line D-D of FIG. 7A.

Referring to FIGS. 7A and 7B, a table top 1 according to another exemplary embodiment further includes a light source 150*a* and a light guide 151, when compared to the table top 1 illustrated in FIGS. 1 to 6. Hereinafter, the table top 1 illustrated in FIGS. 7A and 7B will be described based on differences from FIGS. 1 to 6. Any structure not mentioned specifically herein is the same as that in FIGS. 1 to 6.

The light guide 151 receives light generated by the light source 150A, and guides the received light in one direction. The light guide 151 diffuses and spreads light, which is in a form of point light and incident from the light source 150*a*. That is, the light guide 151 controls luminance of incident light to be uniform, converts incident point light into surface light, and allows the light to exit upward from the energy supply module 130.

The light guide 151 may be installed on the upper portion of the case 131. For example, the light guide 151 may be made of a transparent material, through which light may be transmitted, or a hollow metal pipe. Specifically, the light guide 151 may be made of polymethylmethacrylate (PMMA) or a transparent resin of a flat type or a wedge type. Further, the light guide 151 may be made of glass material and may include plastic lens, but is not limited thereto.

Specifically, the light guide 151 includes: a light emitting surface 158, from which light exits; a light reflecting surface 159 which is opposite the light emitting surface 158; and four sides which connect the light emitting surface 158 and the light reflecting surface 159. However, the structure of the light guide 151 is not limited thereto.

The light reflecting surface 159 forms a rear surface of the light guide 151, and reflects light, incident from the light source 150*a* on a light incident surface 157, in an upward direction.

For example, the light reflecting surface 159 may be formed by depositing an aluminum layer, having excellent reflectivity, on a resin material, or by depositing an aluminum layer, having excellent reflectivity, on a resin material and then arranging a plurality of protrusions randomly. The plurality of protrusions reflect light, incident from the light source 150, in different directions.

The light emitting surface 158 forms a front surface of the light guide 151, and is forwardly spaced apart from the light reflecting surface 159. Air may be filled in a space between the light reflecting surface 159 and the light emitting surface 158. The light emitting surface 158 and the light reflecting surface 159 are disposed in parallel with each other, so that light may be spread efficiently.

Specifically, a reflective pattern 152, which is regularly patterned, may be formed on the light emitting surface 158. The light emitting surface 158 reflects a portion of light, incident from the light source 150 on the light incident surface 157, in a downward direction, and delivers light in a direction opposite to the light incident surface 157, and then enables the remaining portions of light, incident from the light source 150 on the light incident surface 157, to exit through the light emitting surface 158 toward a front portion of the light guide 151.

The light incident surface 157 is interposed between the light reflecting surface 159 and the light emitting surface 158 to receive light from the light source 150*a*.

For example, the light incident surface 157 may be disposed on the side of the light guide 151, may be an open surface, and may be made of a transparent material. Particularly, the area of the light incident surface 157 is smaller than that of the light emitting surface 158.

In another example, the light guide 151 may be made of a light-transmissive material, and may have a structure in which light, incident on the light incident surface 157 of the light guide 151, is transmitted to the inside of the light guide 151 because of a difference in the index of refraction between the light guide 151 and an external environment. However, the structure of the light guide 151 is not limited thereto, and the light guide 151 may have various other structures. Other structures of the light guide 151 will be described later.

The light source 150*a* is disposed to supply light to the light incident surface 157.

Accordingly, by providing the light guide 151, the number of light sources 150 disposed in the energy supply module 130 may be reduced, thereby reducing costs.

Figure 8:
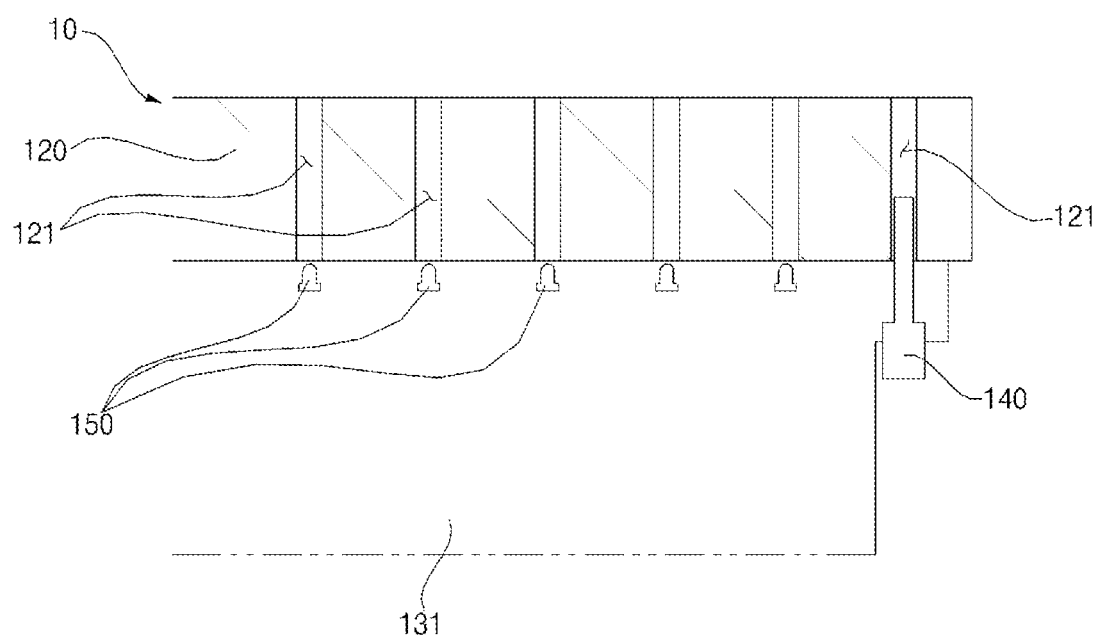
FIG. 8 is a partial cross-sectional view of a table top according to another exemplary embodiment of the present invention.

FIG. 8 is a partial cross-sectional view of a table top 1 according to another exemplary embodiment of the present invention.

Referring to FIG. 8, the table top 1 according to another exemplary embodiment has a structure in which the cover 110 is omitted when compared to the embodiment in FIGS. 1 to 6.

That is, the main body 10 includes the upper plate 120, in which the upper plate 120 is made of an non-transmissive material, through which light may not be transmitted.

Figure 9:
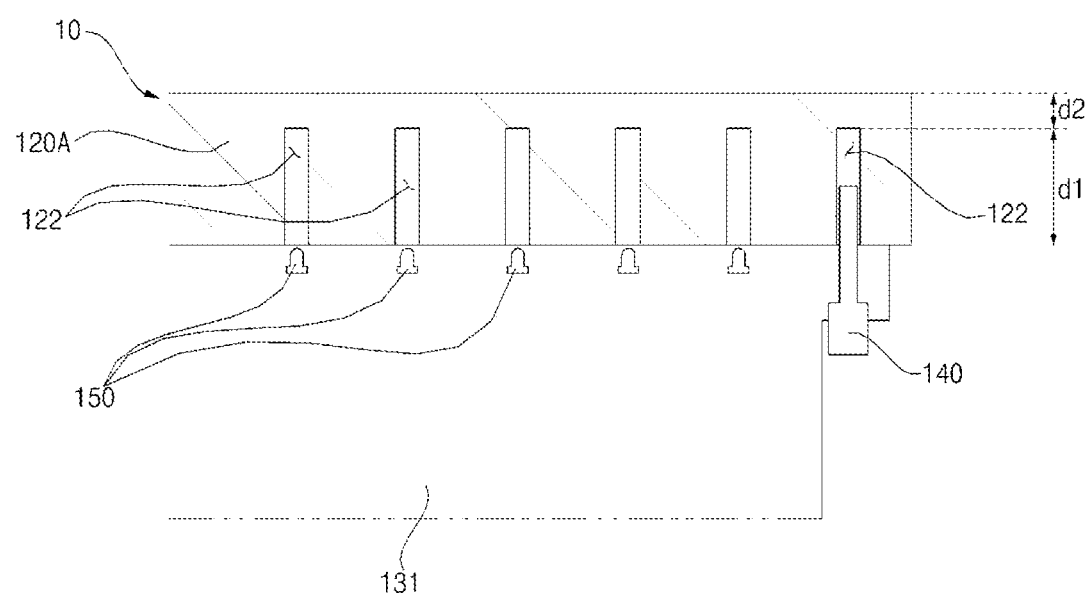
FIG. 9 is a partial cross-sectional view of a table top according to yet another exemplary embodiment of the present invention.

FIG. 9 is a partial cross-sectional view of a table top 1 according to yet another exemplary embodiment of the present invention.

Referring to FIG. 9, the table top 1 according to yet another exemplary embodiment has a structure in which the cover 110 is omitted, and the light-transmissive portion is different, when compared to the embodiment in FIGS. 1 to 6.

The light-transmissive portion is composed of a plurality of light-transmissive grooves 122 formed by denting the upper plate 120a upward from below.

The plurality of light-transmissive grooves 122 are open at the bottom of the upper plate 120a. It is desired that the light-transmissive grooves 122 have a depth d1, at which a depth d2 of the upper plate 120a, which vertically overlaps the light-transmissive grooves 122, may allow light to be transmitted therethrough.

In this case, the upper plate 120a is made of transmissive or semi-transmissive material for light transmission.

Light, generated by the light source 150, is supplied to the light-transmissive grooves 122, and is transmitted through a portion of the upper plate 120a, which vertically overlaps the light-transmissive grooves 122, and then the light is emitted upward from the upper plate 120.

Any one of the light-transmissive grooves 122 is coupled with a coupling member 140 which is connected to the energy supply module 130.

Figure 10:
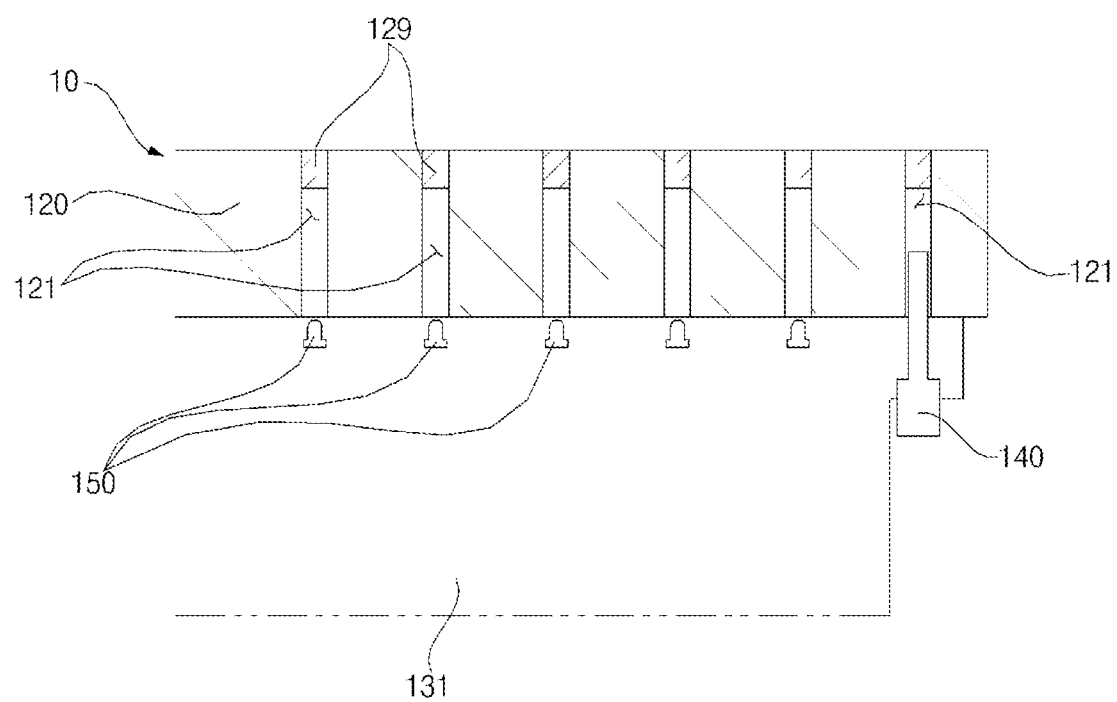
FIG. 10 is a partial cross-sectional view of a table top according to still another exemplary embodiment of the present invention.

FIG. 10 is a partial cross-sectional view of a table top 1 according to still another exemplary embodiment of the present invention.

Referring to FIG. 10, the table top 1 according to still another exemplary embodiment has a structure in which the cover 110 is omitted, and a filling portion 129 is further included, when compared to the embodiment in FIGS. 1 to 6.

In the table top 1, the light-transmissive portion further includes a light-transmissive groove 121, and the filling portion 129 which is made of a transmissive material and is filled in the light-transmissive groove 121.

The filling portion 129 enhances rigidity of the upper plate 120, prevents foreign materials from being introduced through the light-transmissive groove 121, and transmits light.

The filling portion 129 is disposed at an upper portion inside the light-transmissive hole 121. The filling portion 129 may be made of silicone, epoxy, and other resin material having excellent watertightness, corrosion resistance, and insulation.

Figure 11:
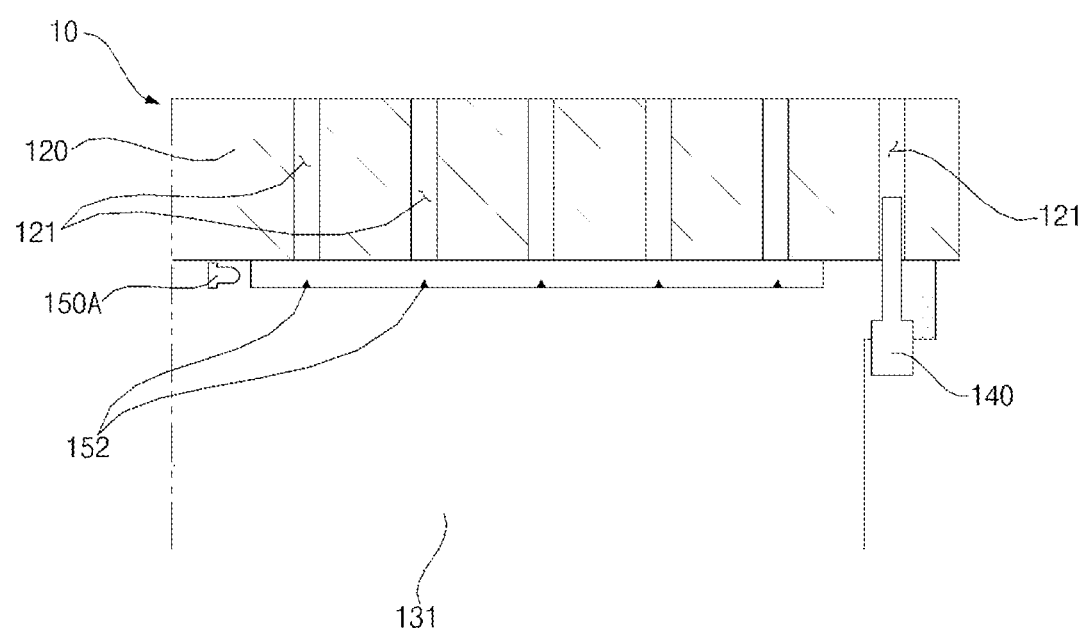
FIG. 11 is a partial cross-sectional view of a table top according to yet another exemplary embodiment of the present invention.

FIG. 11 is a partial cross-sectional view of a table top 1 according to yet another exemplary embodiment of the present invention.

Referring to FIG. 11, the table top 1 according to yet another exemplary embodiment has a structure in which the cover 110 is omitted, a light guide 151 is further included, and a light source 150 is disposed in a different manner, when compared to the embodiment in FIGS. 1 to 6.

Here, the structure of the light guide 151 and the arrangement of the light source 150 are the same as those of FIG. 7; and the structure of the upper plate 120 is the same as that of FIG. 8.

Figure 12:
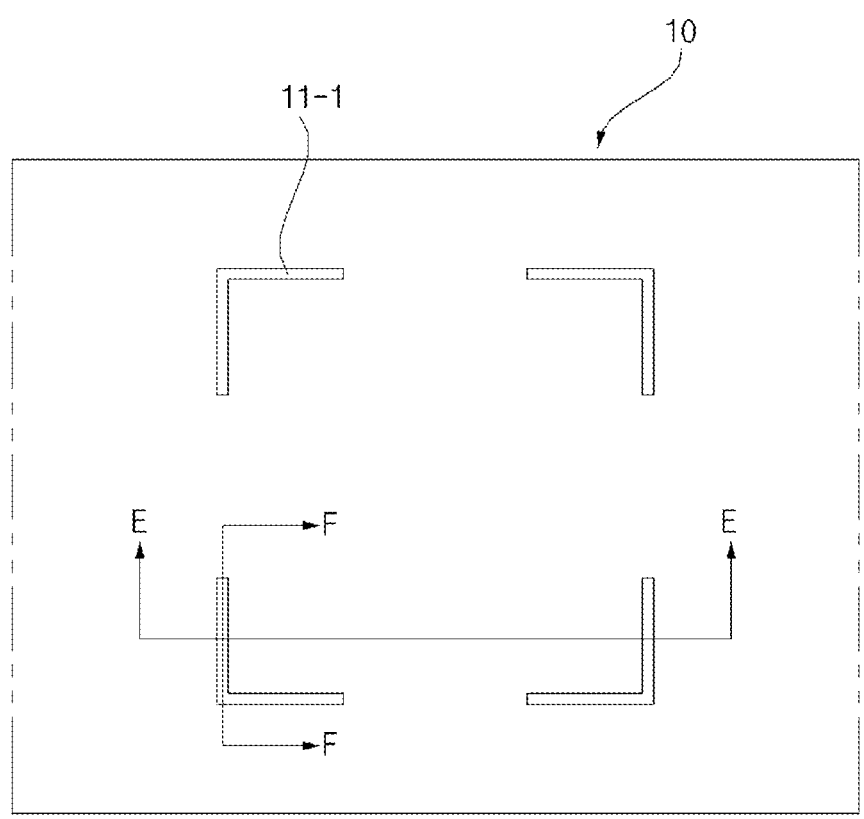
FIG. 12 is a diagram illustrating a table top, as seen from above, according to another exemplary embodiment of the present invention.
Figure 13:
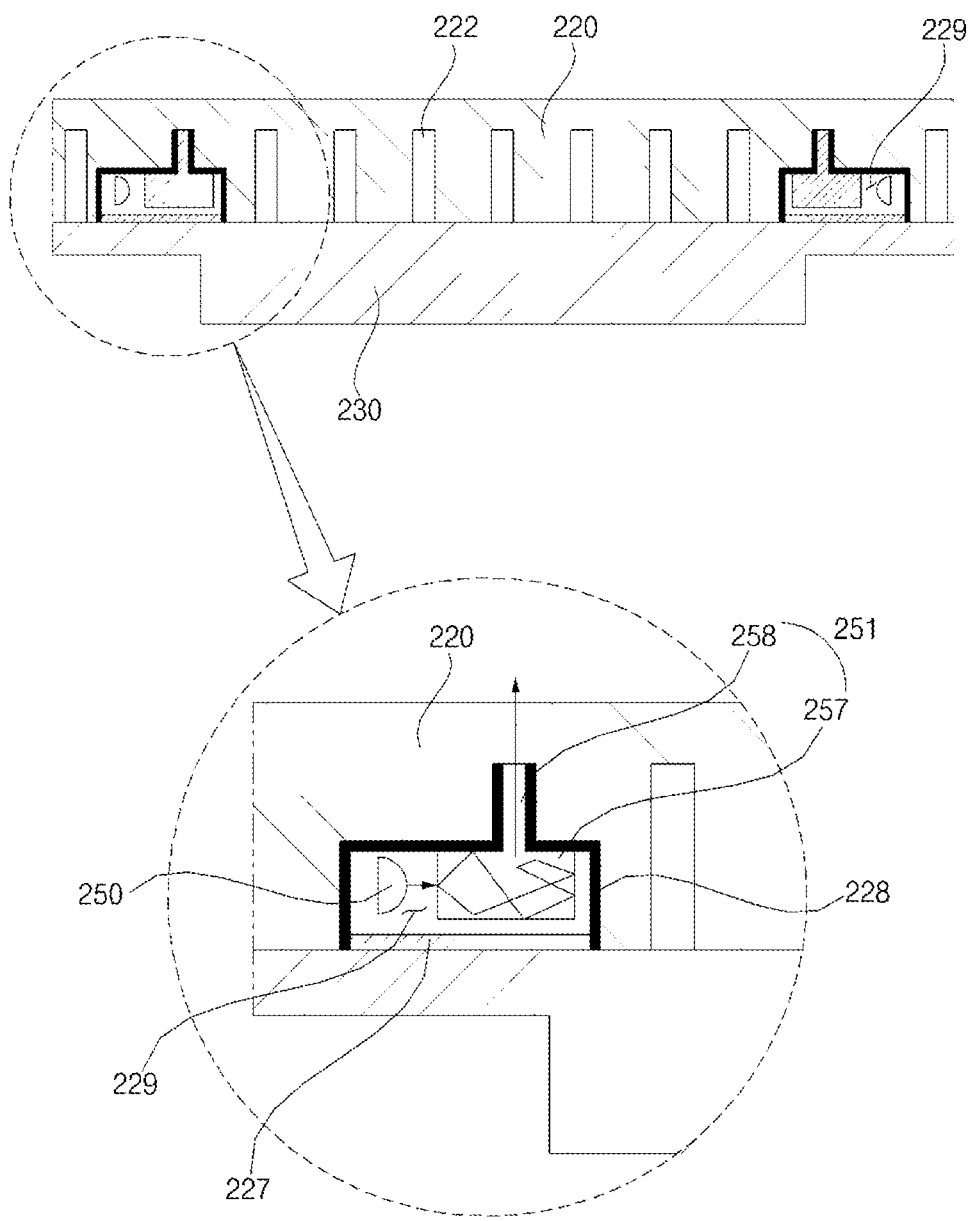
FIG. 13 is a cross-sectional view of the table top of FIG. 12 taken along line E-E of FIG. 12.

FIG. 12 is a diagram illustrating a table top, as seen from above, according to another exemplary embodiment of the present invention; FIG. 13 is a cross-sectional view of the table top of FIG. 12 taken along line E-E of FIG. 12; and FIG. 14 is a cross-sectional view of the table top of FIG. 12 taken along line F-F of FIG. 12.

Figure 14:
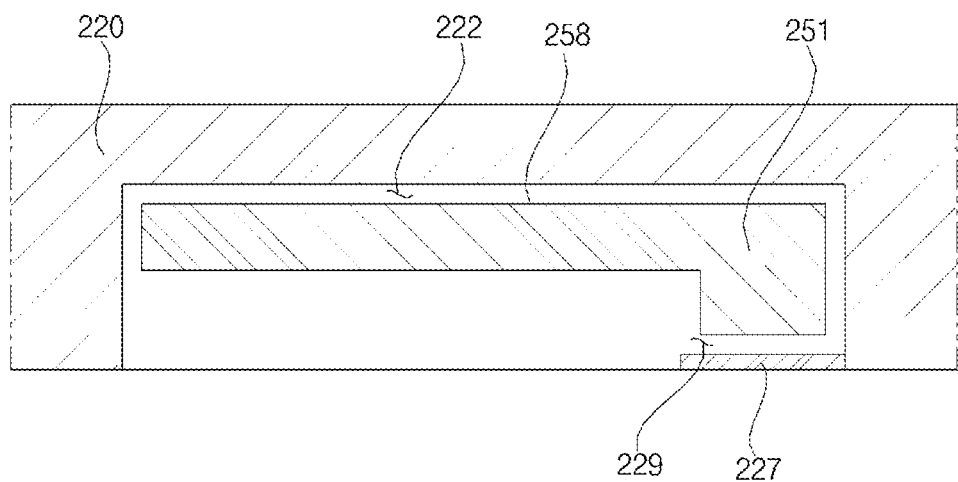
FIG. 14 is a cross-sectional view of the table top of FIG. 12 taken along line F-F of FIG. 12.

Referring to FIGS. 12 to 14, a table top 2 according to another exemplary embodiment includes a main body 10 which supports objects, an energy supply module 230, a light source 250, a light-transmissive portion, and a light guide 251.

Here, the main body 10 may be composed of an upper plate 220 and a cover 110, or the upper plate 220 alone. When compared to the embodiment of FIG. 9, the table top 2 further includes the light guide 251 and a light source accommodating portion 229, and the light source 250 is disposed in a different manner. The light-transmissive portion includes a light-transmissive groove 222.

The upper plate 220 includes the light-transmissive groove 222 and the light source accommodating portion 229. The light source accommodating portion 229 is a space where the light source 250 is accommodated. The light source accommodating portion 229 is formed at a portion of the upper plate 220. For example, the light source accommodating portion 229 may be formed by upwardly denting a lower surface of the upper plate 220 for convenience of assembly. The light source accommodating portion 229 may be connected with or spaced apart from the light-transmissive groove 222.

The light-transmissive groove 222 may be formed as a plurality of grooves, which are formed by denting the upper plate 220 upward from below. The plurality of light-transmissive grooves 222 may have different shapes from each other. For example, some light-transmissive grooves 222 may be formed in a linear shape when viewed from above, to display a specific pattern, while other light-transmissive grooves 222 may be formed in a dotted shape when viewed from above, to display a specific pattern, or may be used as a space to couple the coupling member. In the embodiment, the light-transmissive grooves 222 are formed in a linear shape. The light source accommodating portion 229 is disposed at a lower portion of the light-transmissive grooves 222 for convenience of operation and to prevent exposure of the light source 250 that is caused by transparency of the upper plate 220.

The light source accommodating portion 229 includes a shielding cover 227 and/or a light blocking portion 228 to prevent leakage of light emitted from the light source 250.

The light blocking portion 228 is coated at least on an inner surface the light source accommodating portion 229 to block light leaked to the outside. The light blocking portion 228 may be made of material that absorbs or reflects light. For example, it is desired that the light blocking portion 228 is made of metal material, such as aluminum or silver, which reflects light.

Further, the light blocking portion 228 may be disposed on the inside of a portion of the light-transmissive groove 222. For example, the light blocking portion 228 may be positioned on a portion of the light-transmissive groove 222 except for the upper and lower portions. The light blocking portion 228 prevents light from being leaked to other portions than the upper portion of the light-transmissive groove 222.

The shielding cover 227 shields the light source accommodating portion 229 from the outside environment. Specifically, the shielding cover 227 covers the light source accommodating portion 229 which is open at the bottom. The shielding cover 227 is connected with the lower surface of the upper plate 220 that is on the periphery of the light source accommodating portion 229. The shielding cover 227 shields light leaked to the outside. The shielding cover 227 may be made of material which absorbs or reflects light. For example, it is desired that the shielding cover 227 is made of metal material, such as aluminum or silver, which reflects light.

The light guide 251 guides light, generated by the light source 250, to the light-transmissive portion. The light guide 251 guides at least a portion of light, generated by the light source 250, to be emitted upward from the upper plate 220 through the light-transmissive portion. Accordingly, the light guide 251 may deliver light to a plurality of regions or to a region larger than the light source 250, by using a small number of light sources 250.

The light guide 251 is disposed at a portion corresponding to the periphery of the energy supply module 230. Specifically, the light emitting surface 258 may be disposed at a portion corresponding to the periphery of the energy supply module 230.

Some portion of the light guide 251 is positioned in the plurality of light-transmissive grooves 222, while other portion of the light guide 251 is positioned in the light source accommodating portion 229. Some portion of the light guide 251 may have a shape corresponding to that of the light-transmissive groove 222. That is, the portion of the light guide 251 positioned inside the light-transmissive groove 222 may have a linear shape or a protrusion shape.

Accordingly, light, delivered to the light guide 251 from the light source 250 positioned inside the light source accommodating portion 229, is emitted upward from the upper plate 220 through the light-transmissive portion.

The light incident surface 257 of the light guide 251 is disposed facing the light source 250, and the light emitting surface 258 is disposed facing the upper surface of the upper plate 220. The light incident surface 257 is disposed intersecting the upper surface of the upper plate 220.

Light, generated by the light source 250, is incident on the light incident surface 257 of the light guide 251, and is emitted through the light emitting surface 258. Then, the emitted light passes through the upper plate 220, made of a semi-transparent or transparent material, upward from the upper plate 220.

The cross-sectional area of the light source 250 is smaller than the sum of areas of the light emitting surface 258. The number of the light sources 250 is smaller than the number of light emitting surfaces 258. Accordingly, even by using a small number of light sources 250, light may be emitted to a large area.

Figure 15A:
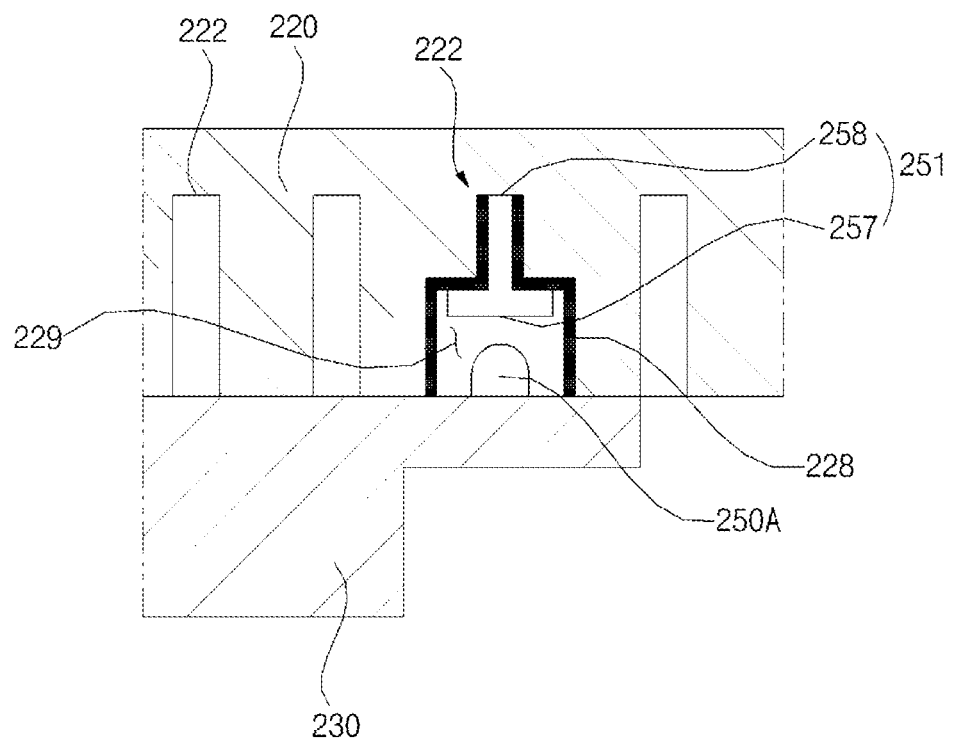
FIG. 15A is a cross-sectional view of a table top according to another exemplary embodiment of the present invention.

FIG. 15A is a cross-sectional view of a table top according to another exemplary embodiment of the present invention.

Referring to FIG. 15A, when compared to the embodiment of FIG. 13, there is a difference in the arrangement of the light source 250a, and the shape of the light guide 251. Further, in the embodiment of FIG. 15A, the shielding cover 227 illustrated in FIG. 13 is omitted.

The light source 250a is positioned in the energy supply module 230. Specifically, the light source 250a is disposed in the energy supply module 230, and supplies light to the light source accommodating portion 229. The light source 250a is disposed in the energy supply module 230, and is exposed to the light source accommodating portion 229. The light source 250a is partially disposed on at least a portion of the periphery of the energy supply module 230. Once the light source 250a is disposed in the energy supply module 230, the convenience of operation is improved. In this case, the energy supply module 230 partially shields the light source accommodating portion 229. The light source 250a is disposed on the upper surface of the energy supply module 230, and a portion of the upper surface of the energy supply module 230 covers the light source accommodating portion 229. The energy supply module 230 blocks light leaked from the light source accommodating portion 229.

In this case, the light guide 251 guides light, generated by the light source 250a, to be emitted upward from the upper plate 220 through the light-transmissive portion. Specifically, the light incident surface 257 and the light emitting surface 258 of the light guide 251 are disposed to face each other, and the light incident surface 257 is disposed facing the light source 250a. The light incident surface 257 forms a lower surface of the light guide 251, and the light emitting surface 258 forms an upper surface of the light guide 251.

Figure 15B:
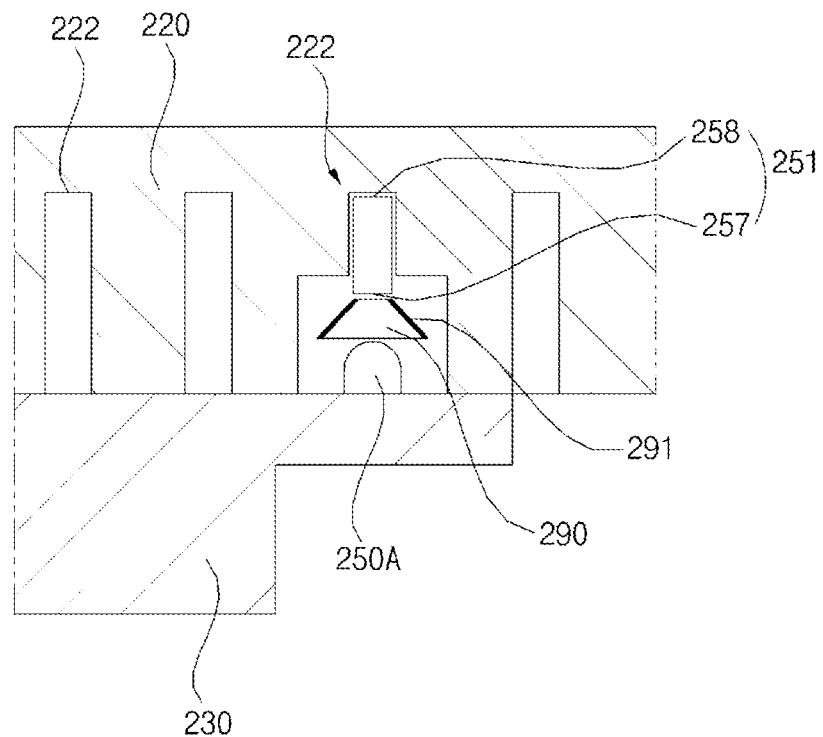
FIG. 15B is a cross-sectional view of a table top according to another exemplary embodiment of the present invention.

FIG. 15B is a cross-sectional view of a table top according to another exemplary embodiment of the present invention.

Referring to FIG. 15B, a condenser lens 290 is further included when compared to the embodiment in FIG. 15A.

The condenser lens 290 focuses light generated by the light source 250a, and provides the focused light to the light guide 251. Specifically, the condenser lens 290 focuses light generated by the light source 250a, and emits the focused light to the light incident surface 257 of the light guide 251. The condenser lens 290 is disposed in the light source accommodating portion 229. The condenser lens 290 is disposed between the light guide 251 and the light source 250. The condenser lens 290 may have a structure well known in the art.

The condenser lens 290 may prevent light, which is incident inward due to a difference in the index of refraction from an outside environment, from being emitted to the outside. In another example, as illustrated in FIG. 15B, the condenser lens 290 has a progressively narrower area from bottom to top in the cross-sectional view, and the sides of the condenser lens 290 may be surrounded by a reflector 291. The reflector 291 is formed in a shape corresponding to the shape of the sides of the condenser lens 290.

Figure 16:
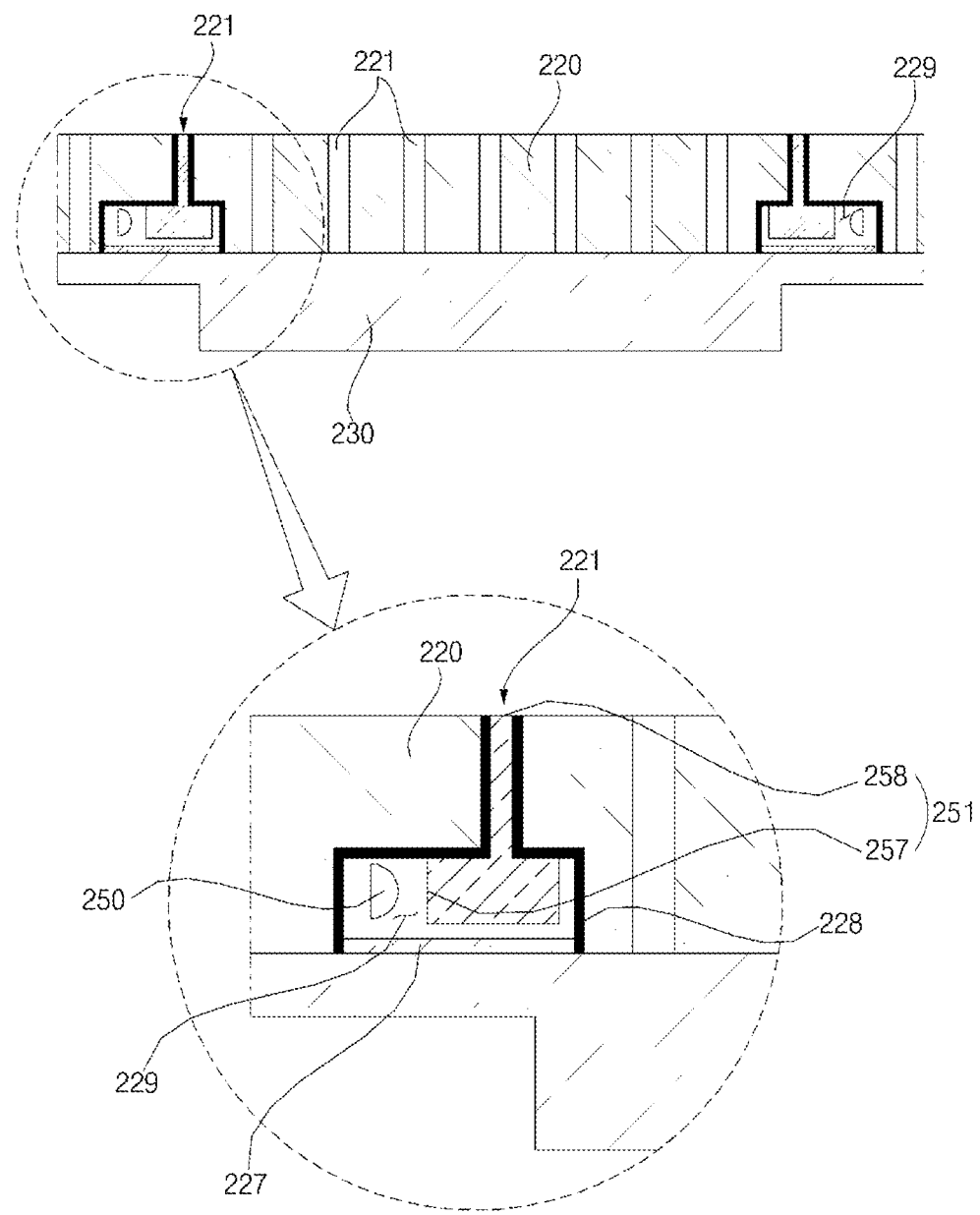
FIG. 16 is a cross-sectional view of a table top according to yet another exemplary embodiment of the present invention.

FIG. 16 is a cross-sectional view of a table top according to yet another exemplary embodiment of the present invention.

Referring to FIG. 16, when compared to the embodiment of FIG. 13, there is a difference in the structure of the light-transmissive portion and the light guide 251.

In FIG. 16, the light-transmissive portion is composed of a plurality of light transmissive-holes 221, which are formed by perforating the upper plate 220 upward from below. Some of the plurality of light-transmissive holes 221 are connected with the light source accommodating portion 229, and others may be spaced apart from the light source accommodating portion 229. In order to prevent light leakage, the light-transmissive holes 221, connected with the light source accommodating portion 229, are disposed on an upper portion of the light source accommodating portion 229.

The light-transmissive hole 221 is a space where light, generated by the light source 250, passes. After passing through the light-transmissive hole 221, light is projected onto the cover 110, thereby forming the boundary pattern 11-1 which displays a position where a cooking device or an electronic device is located. Further, after passing through the light-transmissive hole 221, light is emitted upward from the upper plate 120, thereby forming the boundary pattern 11-1 which displays a position where a cooking device or an electronic device is located.

In this case, it is desired that the upper plate 220 is made of a non-transmissive material, through which light may not be transmitted.

Some portion of the light guide 251 is positioned in the plurality of light-transmissive holes 221, and the other portion of the light guide 251 is positioned in the light source accommodating portion 229. Some portion of the light guide 251 may have a shape corresponding to that of the light-transmissive groove 221. That is, the portion of the light guide 251 positioned inside the light-transmissive groove 221 may have a linear shape or a protrusion shape.

Accordingly, light, delivered to the light guide 251 from the light source 250 positioned inside the light source accommodating portion 229, is emitted upward from the upper plate 220 through the light-transmissive portion.

The light incident surface 257 of the light guide 251 is disposed facing the light source 250, and the light emitting portion 258 is disposed facing the upper surface of the upper plate 220. The light incident surface 257 is disposed intersecting the upper surface of the upper plate 220.

Figure 17:
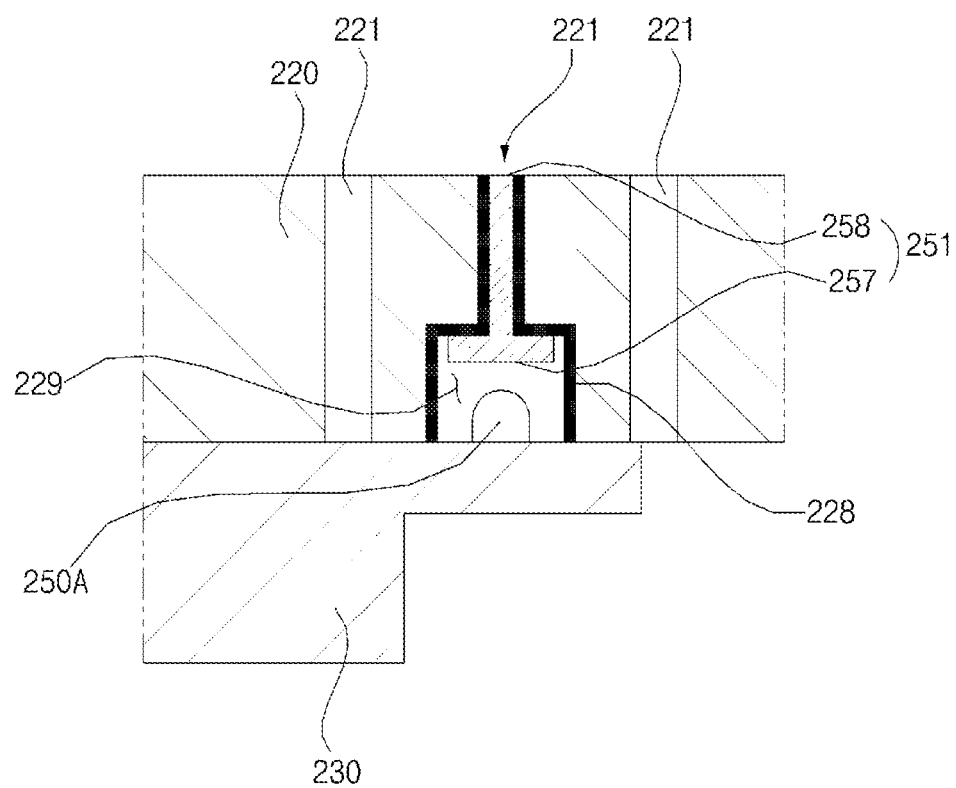
FIG. 17 is a cross-sectional view of a table top according to still another exemplary embodiment of the present invention.

FIG. 17 is a cross-sectional view of a table top according to still another exemplary embodiment of the present invention.

Referring to FIG. 17, when compared to the embodiment of FIG. 16, there is a difference in the arrangement of the light source 250, and the shape of the light guide 251. Further, in the embodiment of FIG. 17, the shielding cover 227 illustrated in FIG. 16 is omitted.

The light source 250a is positioned in the energy supply module 230. Specifically, the light source 250a is disposed in the energy supply module 230, and supplies light to the light source accommodating portion 229. The light source 250a is disposed in the energy supply module 230, and is exposed to the light source accommodating portion 229. The light source 250a is partially disposed on at least a portion of the periphery of the energy supply module 230. Once the light source 250a is disposed in the energy supply module 230, the convenience of operation is improved. In this case, the energy supply module 230 partially shields the light source accommodating portion 229. The light source 250a is disposed on the upper surface of the energy supply module 230, and a portion of the upper surface of the energy supply module 230 covers the light source accommodating portion 229. The energy supply module 230 blocks light leaked from the light source accommodating portion 229.

In this case, the light guide 251 guides light, generated by the light source 250a, to be emitted upward from the upper plate 220 through the light-transmissive portion. Specifically, the light incident surface 257 and the light emitting surface 258 of the light guide 251 are disposed facing each other, and the light incident surface 257 is disposed facing the light source 250a. The light incident surface 257 forms a lower surface of the light guide 251, and the light emitting surface 258 forms an upper surface of the light guide 251

Figure 18:
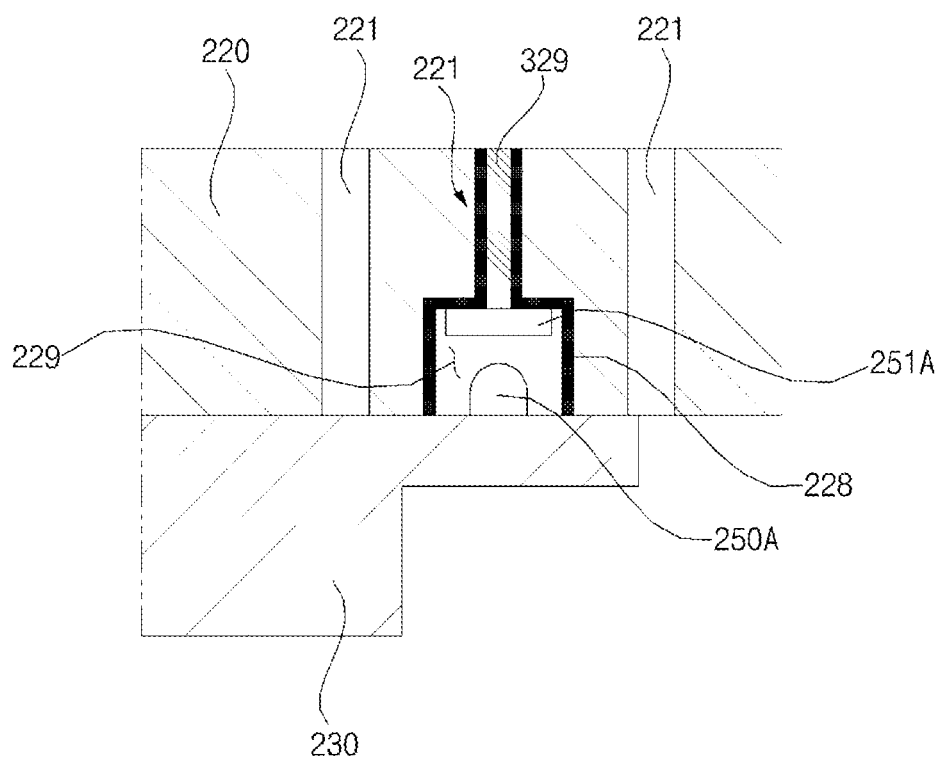
FIG. 18 is a cross-sectional view of a table top according to yet another exemplary embodiment of the present invention.

FIG. 18 is a cross-sectional view of a table top according to yet another exemplary embodiment of the present invention.

Referring to FIG. 18, when compared to the embodiment of FIG. 17, there is a difference in the structure of the light guide 251, and in that a molding portion 329 is further included.

In FIG. 18, the molding portion 329 is filled in the light-transmissive hole 221. The molding portion 329 is made of a transmissive material through which light may be transmitted.

Here, the molding portion 329 enhances rigidity of the upper plate 220, prevents foreign materials from being introduced through the light-transmissive groove 221.

The molding portion 329 may be disposed in some or entire portion of the light-transmissive hole 221. FIG. 18 illustrates an example where the molding portion 329 is disposed in the entire portion of the light-transmissive hole 221, but is not limited thereto. The molding portion 329 may be made of silicone, epoxy, and other resin material having excellent watertightness, corrosion resistance, and insulation.

The light guide 251 is disposed to supply light, incident from the light source 250a, to the light-transmissive hole 221. Light, incident to the light-transmissive hole 221, passes through the molding portion 329 to be emitted upward from the upper plate 220. In the case where the molding portion 329 is disposed in the entire portion of the light-transmissive hole 221, the entire portion of the light guide 251 is disposed in the light source accommodating portion 229, while in the case where the molding portion 329 is disposed in some portion of the light-transmissive hole 221, some portion of the light guide 251 is disposed in the light source accommodating portion 229, and the other portion thereof is disposed in the light-transmissive hole 221.

Figure 19:
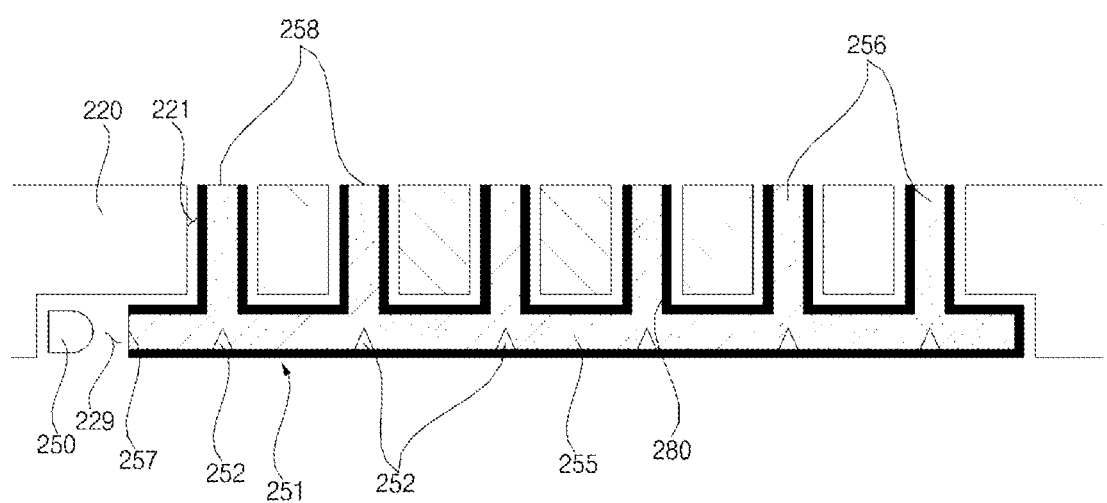
FIG. 19 is a cross-sectional view of a table top to explain the structure of a light guide.

FIG. 19 is a cross-sectional view of a table top to explain the structure of a light guide.

Referring to FIG. 19, the light guide 251 diffuses light, incident from the light source 250, in a longitudinal direction of the light guide 251, and emits light in a direction intersecting the longitudinal direction of the light guide 251.

Some portion of the light guide 251 is disposed in the plurality of light-transmissive holes 221, and other portion thereof is disposed in the light source accommodating portion 229. Some portion of the light guide 251 may have a shape corresponding to the shape of the light-transmissive holes 221. Specifically, the light guide 251 includes: a body 255, which includes a light incident surface 257, on which light is incident, and diffuses light in a longitudinal direction of the light guide 251; and a plurality of insertion protrusions 256 inserted into the light transmissive holes 221.

The body 255 has the light incident surface 257 on one side, and diffuses and delivers light, incident on the light incident surface 257, in one direction. Specifically, the body 255 may be made of a transparent material through which light may be transmitted, or may be a hollow metal pipe. The body 255 may have the light incident surface 257 on one side, and a light reflecting surface on the other side. A reflection pattern 252, which is patterned to reflect light, may be formed on a bottom surface of the body 255.

The insertion protrusion 256 receives light, diffused from the body 255, and emits the received light through some portion thereof. The insertion protrusion 256 has a light emitting surface 258. The light emitting surface 258 is disposed intersecting a longitudinal direction of the light-transmissive hole 221. It is desired that the light emitting surface 258 is disposed in parallel with the upper surface of the upper plate 220.

The insertion protrusion 256 is inserted into the light-transmissive holes 221. Although not illustrated in FIG. 19, the insertion protrusion 256 may be inserted into the light-transmissive grooves 222.

The number of the light sources 250 is smaller than the number of light emitting surfaces 258. Accordingly, even by using a small number of light sources 250, light may be emitted to a large area.

A light blocking layer 280, which blocks light from being emitted to the outside, is further included in an outer surface of the light guide 251. The light blocking layer 280 is disposed on the outer surface of the light guide 251 except for the light incident surface 257 and the light emitting surface 258. The light blocking layer 280 may be made of material which absorbs or reflects light. For example, it is desired that the light blocking layer 280 is made of metal material, such as aluminum or silver, which reflects light.

FIG. 20 is a control block diagram illustrating a table top according to an exemplary embodiment.

Referring to FIG. 20, the table top may further include a sensor unit, an instruction input unit 91, and a controller 93.

The sensor unit includes at least one of a temperature sensor 31, a detection sensor 32, and a pressure sensor 33. It is desired that the sensor unit may include the temperature sensor 31, the detection sensor 32, and the pressure sensor 33 which are formed in a module.

The sensor unit is positioned at the upper plate 120 where a cooking device is supported or at the energy supply module 130, so that the state of the cooking device may be easily checked.

The temperature sensor 31 measures temperature of the cooking device, and provides a measurement value to the controller 93.

The detection sensor 32 detects whether the cooking device is positioned on the upper plate 120, and provides a detection value to the controller 93. The detection sensor 32 includes an illumination sensor or a proximity sensor.

The illumination sensor senses information on brightness at the top of the upper plate 120, and provides the sensed information to the controller 93. Based on the illumination values input into the illumination sensor, the controller 93 determines whether a cooking device is positioned on the upper plate 120.

The proximity sensor senses a cooking device coming near to the top of the upper plate 120, and provides the information to the controller 93. The proximity sensor is a sensor that can detect objects coming near to a detection surface or detect the presence of nearby objects by emitting electromagnetic field or a beam of infrared without any physical contact. Examples of the proximity sensor includes a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. Based on the values input into the proximity sensor, the controller 93 determines whether there is a cooking device on the upper plate 120.

The pressure sensor 33 measures pressure on the upper plate 120, and outputs the pressure values to the controller 93. Based on the pressure values input into the pressure sensor 33, the controller 93 determines whether there is a cooking device on the upper plate 120.

A display unit 90 displays information that may be visually recognized. The display unit 90 is a display device which outputs texts or images. The display unit 90 receives input of a control signal of the controller 93, and outputs texts or images corresponding to temperature information, weight information, and cooking device information.

The instruction input unit 91 receives input of a user's instruction, changes the instruction into an instruction signal, and outputs the instruction signal to the controller 93. Based on the instruction signal, the controller 93 controls the light source 150. The instruction input unit 91 includes a button, a touch sensor, a dial, and the like, which are physical input devices that receive input of a user's instruction. The instruction input unit 91 includes a touch panel which overlaps with the display unit 90 in a layer, and may operate as a touch screen to enable information to be input from a user's touch.

The controller 93 controls the overall operation of the energy supply module 130 and the light source 150.

The controller 93 controls the light source 150 based on temperature information provided by the temperature sensor 31. Specifically, based on the temperature information provided from the temperature sensor 31, the controller 93 controls the light source 150 in comparison with the display unit 90.

For example, in the case where the temperature of a cooking device is the same as a set temperature, the controller 93 controls an illumination value of the light source 150 and the display unit 90 to be equal to each other. The set temperature may be a temperature value pre-stored in a memory, or may be a value set by a user through the instruction input unit 91. In the case where the temperature of the cooking device is the same as a predetermined temperature, the controller 93 controls the illumination value of the light source 150 and the display unit 90 to be equal to each other, such that a user may recognize visually and instinctively a heating degree of a cooking device. Here, when the light source 150 and the display unit 90 have an identical illumination value, the "identical illumination value" is not strictly in a mathematical sense but in an engineering sense within an error range. In the embodiment, it is desired to include an illumination sensor to measure an illumination value of the light source 150 and the display unit 90.

The controller 93 controls the color or illumination of the display unit 90 based on the set temperature value input by the instruction input unit 91. Specifically, the controller 93 may output a control signal to adjust the illumination value of the display unit 90 in proportion to the set temperature input by the instruction input unit 91. That is, as the set temperature input by the instruction input unit 91 is higher, the controller 93 controls the display unit 90 to have a higher illumination value.

In another example, in the case where the temperature of the cooking device is the same as the predetermined temperature, the controller 93 controls the color of the light source 150 and the display unit 90 to be identical to each other. In this case, the controller 93 controls the color of the light source 150 and the display unit 90 to be identical to each other, such that a user may recognize visually and instinctively a heating degree of the cooking device.

The controller 93 changes the state of the light source 150 according to the control signal input by the detection sensor 32. Based on the detection signal input by the detection sensor 32, the controller 93 determines the presence of a cooking device. In the case where there is a cooking device, the controller 93 may turn on the light source 150, may change the illumination or color of the light source 150, or may change the turned-on region of the light source 150.

The controller 93 changes the state of the light source 150 according to a changed weight of a cooking device. Based on a pressure signal input by the pressure sensor 33, the controller 93 determines whether the weight of a cooking device is changed. In the case where the weight of a cooking device is changed, the controller 150 may turn on the light source 150, may change the illumination or color of the light source 150, or may change the turned-on region of the light source 150.

The controller 93 changes the state of the light source 150 according to an input signal from the instruction input unit 91. Once an initial instruction signal (signal generated by an initial touch input) is input by the instruction input unit 91, the controller 93 may turn on the light source 150, may change the illumination or color of the light source 150, or may change the turned-on region of the light source 150.

In another example, in the case where the temperature of the cooking device is the same as the predetermined temperature, the controller 93 may control the light source 150 to be turned on for a predetermined period of time, may change the illumination or color of the light source 150, or may change the turned-on region of the light source 150.

In the embodiment, the table top enables a user to recognize an arrangement position of a cooking device or an electronic device, and provides a space where a coupling member may be connected.

The table top provides a space where light supplied by the light source is transmitted, and a coupling member is connected, thereby making a better use of space in the upper plate.

In the table top, a light-transmissive portion is used, such that a heating region may be displayed on an upper portion of the table top without reducing rigidity of the table top, and the heating region may be readily changed.

In the table top, even when a small number of light sources are used, various images may be output on the top of the upper plate.

The above described features, configurations, effects, and the like are included in at least one of the embodiments of the present invention, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the invention as disclosed in the accompanying claims.

What is claimed is:

1. A table top comprising:
   an upper plate, which is a plate-shaped non-magnetic member and supports an electronic or cooking device placed thereon;
   an energy supply module, which is disposed under the upper plate so as to supply energy to the electronic or cooking device;
   at least one light source configured to generate light;
   at least one light-transmissive portion, which is provided in the upper plate and through which the light generated by the light source is transmitted; and
   at least one light guide configured to guide the light, generated by the light source, to the light-transmissive portion,
   wherein the at least one light guide allows a portion of the light, generated by the light source, to be emitted upward from the upper plate through the light-transmissive portion, and
   wherein at least a part of the at least one light guide is positioned inside the light-transmissive portion and has a linear shape or a protrusion shape.

2. The table top according to claim 1, wherein at least a part of the at least one light guide has a shape corresponding to that of the light-transmissive portion.

3. The table top according to claim 1, wherein the upper plate includes a light source-accommodating portion for accommodating the light source, and the light source is disposed in the light source-accommodating portion.

4. The table top according to claim 3, wherein the light-transmissive portion includes a plurality of light-transmissive holes, which are formed by perforating the upper plate upward from below, and some of the plurality of light-transmissive holes communicate with the light source-accommodating portion.

5. The table top according to claim 3, wherein a part of the at least one light guide is positioned in the plurality of light-transmissive grooves, and another part of the at least one light guide is positioned in the light source accommodating portion.

6. The table top according to claim 3, further comprising a light-blocking plate for restricting outward emission of the light in the light source-accommodating portion.

7. The table top according to claim 3, wherein the light-transmissive portion includes a plurality of light-transmissive grooves, which are formed by denting the upper plate upward from below, and the plurality of light-transmissive grooves communicate with the light source-accommodating portion.

8. The table top according to claim 7, wherein a portion of the at least one light guide is disposed in the light source-accommodating portion.

9. The table top according to claim 7, wherein the at least one light guide includes a light-incident surface, which faces the light source and on which a light emitted from the light source is incident, and a plurality of light-emitting surfaces, from which the light, which has been incident on the light-incident surface, exits.

10. The table top according to claim 9, further comprising a light-blocking layer, which covers an outer surface of the at least one light guide other than the light-incident surface and a light-emitting surface of the plurality of light-emitting surfaces so as to block outward emission of light from the at least one light guide.

11. The table top according to claim 9, wherein the light source includes a smaller number of light sources than a number of the plurality of light-emitting surfaces.

12. The table top according to claim 1, wherein the at least one light guide is disposed along a periphery of the energy supply module.

13. The table top according to claim 1, further comprising:
    a light source-accommodating portion that is formed by denting a lower surface of the upper plate upward; and
    a shielding cover for shielding the light source-accommodating portion.

14. The table top according to claim 1, wherein the light-transmissive portion includes a plurality of light-transmissive holes, which are formed by perforating the upper plate upward from below.

15. The table top according to claim 14, wherein one of the plurality of light-transmissive holes is provided with a coupling member connected to the energy supply module.

16. The table top according to claim 1, further comprising a reflective pattern that is formed on the light emitting surface and regularly patterned.

17. The table top according to claim 1, wherein the at least one light guide is disposed at a portion corresponding to the periphery of the energy supply module.

18. The table top according to claim 1, wherein the light-transmissive portion includes a plurality of light-transmissive grooves, which are formed by denting the upper plate upward from below.

19. The table top according to claim 18, wherein one of the plurality of light-transmissive grooves is provided with a coupling member connected to the energy supply module.

\* \* \* \* \*